(12) United States Patent
Pape et al.

(10) Patent No.: US 11,484,917 B2
(45) Date of Patent: Nov. 1, 2022

(54) DEVICE AND METHOD FOR CLEANING THE SURFACE OF A TOOL (71) Applicants: HAMMELMANN GMBH, Oelde (DE); PURIMA GMBH & CO. KG, Porta Westfalica (DE)

(72) Inventors: Ralf Pape, Porta Westfalica (DE); Stephan Lückemeier, Oelde (DE)

(73) Assignees: HAMMELMANN GMBH, Oelde (DE); PURIMA GMBH & CO. KG, Porta Westfalica (DE)

(*) Notice: Subject to any disclaimer, the term of this patent is extended or adjusted under 35 U.S.C. 154(b) by 731 days.

(21) Appl. No.: 16/331,422

(22) PCT Filed: Sep. 5, 2017

(86) PCT No.: PCT/EP2017/072141
§ 371 (c)(1),
(2) Date: Mar. 7, 2019

(87) PCT Pub. No.: WO2018/046456
PCT Pub. Date: Mar. 15, 2018

(65) Prior Publication Data
US 2021/0283663 A1 Sep. 16, 2021

(30) Foreign Application Priority Data
Sep. 8, 2016 (DE) .......................... 102016116797.5

(51) Int. Cl.
B08B 3/02 (2006.01)
B08B 1/00 (2006.01)

(52) U.S. Cl.
CPC .............. B08B 3/024 (2013.01); B08B 1/002 (2013.01); B08B 3/02 (2013.01); B08B 2203/0229 (2013.01)

(58) Field of Classification Search
None
See application file for complete search history.

(56) References Cited

U.S. PATENT DOCUMENTS 4,585,168 A * 4/1986 Even ................. B08B 3/026
239/74
5,991,968 A * 11/1999 Moll ................. B08B 3/024
15/322

(Continued)

FOREIGN PATENT DOCUMENTS

CN 103358115 10/2013
DE 19539586 9/1996

(Continued)

OTHER PUBLICATIONS

Search Report issued in German App. No. 102016116797.5 (dated May 9, 2017).

(Continued)

Primary Examiner — Mikhail Kornakov
Assistant Examiner — Ryan L Coleman
(74) Attorney, Agent, or Firm — Barnes & Thornburg LLP (57) ABSTRACT The invention relates to a device for cleaning the surface of a tool for shaping the surface of a large-area fiber composite material body using a highly pressurized cleaning liquid, having a nozzle support which is held on a central bearing in a rotatable manner, at least one jet nozzle which is held in an arm of the nozzle support and out of which the highly pressurized cleaning liquid exits during operation, and a control unit for controlling the cleaning liquid pressure to be applied, wherein the nozzle support is surrounded by a housing which is provided with an opening towards the tool surface to be cleaned. The housing is connected to a suction device by means of which a housing interior equipped with the nozzle support can be suctioned. The housing interior is (Continued)

connected to an outer surrounding area via a pressure valve, and a liquid-tight seal with a flexible shape is arranged on a housing end which forms the opening, wherein the seal can be used to seal the space between the nozzle support and the body surface to be cleaned from the outer surrounding area, and the control unit has at least two pressure range settings. The invention additionally relates to a method for cleaning a surface of a tool.

20 Claims, 4 Drawing Sheets

(56) References Cited

U.S. PATENT DOCUMENTS

| | | | |
|---|---|---|---|
| 6,081,960 A | 7/2000 | Shook et al. | |
| 2002/0178529 A1* | 12/2002 | Geyer | E01H 1/103 15/320 |
| 2013/0118529 A1* | 5/2013 | Gromes, Sr. | A47L 11/4044 134/21 |
| 2014/0216836 A1 | 8/2014 | Davies et al. | |
| 2015/0121649 A1* | 5/2015 | Dever | A47L 9/02 15/347 |
| 2016/0332282 A1* | 11/2016 | Bigot | B24C 9/003 |

FOREIGN PATENT DOCUMENTS

| | | |
|---|---|---|
| DE | 10327413 | 1/2005 |
| EP | 2354315 | 8/2011 |
| GB | 2221630 | 2/1990 |
| JP | 2005319351 | 11/2005 |
| WO | WO 2013/164487 | 11/2013 |

OTHER PUBLICATIONS

Search Report issued in Int'l App. No. PCT/EP2017/072141 (dated Dec. 4, 2017).

* cited by examiner

DEVICE AND METHOD FOR CLEANING THE SURFACE OF A TOOL

CROSS REFERENCE TO RELATED APPLICATIONS

This application is a U.S. nationalization under 35 U.S.C. § 371 of International Patent Application No. PCT/EP2017/072141, filed Sep. 5, 2017, which claims priority to German Patent Application No. 102016116797.5, filed Sep. 8, 2016. The disclosures set forth in the referenced applications are incorporated herein by reference in their entireties.

BACKGROUND AND SUMMARY OF THE DISCLOSURE

The present disclosure relates to a device for cleaning the surface of a tool for forming a large-area fiber composite material body using a highly-pressurized cleaning liquid.

The disclosure further relates to a method for cleaning the surface of a tool for forming a large-area fiber composite material body.

In the production of large-area and safety-relevant components from fiber composite materials, for example, CFRP (carbon-fiber reinforced plastic) or GFRP (glass-fiber reinforced plastic), the cleanliness of the three-dimensional negative molds, which are usually metallic, of such complex components is of great significance, since when these negative molds are used for producing further components, in the event of residual soiling of these negative molds, which are also referred to as tools, contamination of the component subsequently to be produced and production flaws during the demolding can occur.

Such soiling-related production flaws are to be avoided as much as possible in particular because of the size of the complex components considered here and the substantial economic losses and possible delivery delays accompanying them.

Furthermore, process-safe handling of such, in particular, safety-relevant, components is extraordinarily important, since soiling-related quality deviations are accompanied by a high risk upon use of these components, so that such quality deviations generally result in the rejection of these components.

Moreover, it is important not to leave residues of the cleaning medium on the tools during the cleaning of these tools. Water residues left on the tools, in particular, upon the use of the tool of a subsequent component, would thus result in bubbling in the layers of the fiber composite material, which consist of resin such as epoxy resin or laminating resin, during the curing under defined temperature and pressure conditions, which would also result in the discard of this component and the economic damages accompanying this.

The present disclosure is directed to a device for cleaning the surface of such a tool, for example, a tool for the forming of the surface of a large-area fiber composite material body, and a process-safe method for cleaning the surface of such a tool.

A device according to the present disclosure for cleaning the surface of a tool for the forming of a large-area fiber composite material body using a highly-pressurized cleaning liquid comprises a nozzle support rotatably mounted on a central bearing and also at least one jet nozzle held in an arm of the nozzle support, from which the highly-pressurized cleaning liquid exits during operation.

A control unit of the device is used in this case for the control of the pressure of the cleaning liquid to be applied.

The nozzle support is enclosed by a housing, which is open toward the surface of the tool to be cleaned. The housing is furthermore attached to a suction unit, using which an interior of the housing, in which the nozzle support is arranged, can be suctioned out. The interior of the housing is connected via a pressure valve to the external environment to avoid the occurrence of a strong partial vacuum.

A shape-flexible liquid-tight seal is arranged at the open end of the housing, using which the space between the nozzle support and the surface of the body to be cleaned can be sealed off from the external environment.

The control unit has at least two pressure range settings, wherein in a first pressure range setting, the pressure of the cleaning liquid exiting from the at least one jet nozzle is set in such a way that fiber composite material residues are removable from a surface of the tool coated using a release agent, without damaging the release agent layer, and in a second pressure range setting, the pressure of the cleaning liquid exiting from the at least one jet nozzle is set in such a way that the release agent is removable from the surface of the tool using the at least one jet nozzle.

Secure suctioning off of dirt detached from the surface of the tool by the highly-pressurized cleaning liquid is ensured using a cleaning device designed in this manner.

Due to the design of the seal as a shape-flexible seal, moving the device over points of discontinuity in the surface of the tool to be processed, for example, edges, depressions, or the like, is also enabled, since the shape-flexible seal is capable of adapting to such a contour, and is simultaneously technically liquid-tight, so that an escape of cleaning liquid in particular from the interior of the housing is effectively avoided.

A collapse of the partial vacuum in the interior when moving over points of discontinuity is prevented by the closing of the pressure valve and secure suctioning off is thus also ensured in this situation.

In the method according to the present disclosure for cleaning the surface of a tool for forming a large-area fiber composite material body using an above-described device, at least a position and advance velocity of the nozzle support in relation to the surface of the body to be cleaned and a pressure to be applied of the cleaning liquid exiting from the at least one jet nozzle are controlled by the control unit.

The control unit has at least two pressure range settings, wherein in a first pressure range setting, the pressure of the cleaning liquid exiting from the at least one jet nozzle is set in such a way that fiber composite material residues are removed from a surface of the tool coated using a release agent, without damaging the release agent layer, and in a second pressure range setting, the pressure of the cleaning liquid exiting from the at least one jet nozzle is set in such a way that the release agent is removed from the surface of the tool using the at least one jet nozzle.

The above-described requirements for the cleaning of the surface of such a tool are enabled using the method according to the disclosure.

According to one embodiment of the device according to the disclosure, the housing comprises a double-walled lateral surface, having an intermediate chamber formed between an outer wall and an inner wall, wherein a shape-flexible seal is arranged in each case on the outer wall and the inner wall.

This intermediate chamber is preferably operationally connected to an air purge unit. This air purge is blown in this case through the intermediate chamber in the direction of the open end of the housing and thus ensures that the seal of the interior of the housing is improved once again.

A further improvement of the sealing action may be achieved in that according to a further embodiment, the outer wall and/or the inner wall of the housing is designed as rotatable about an axis of rotation of the nozzle support.

To enable the most homogeneous possible energy distribution by the highly-pressurized cleaning liquid on the surface of the tool, the nozzle support is preferably designed as vertically adjustable along its axis of rotation.

For the most exact possible adaptation and alignment of the device to the surface of the tool to be cleaned, the central bearing is fixed on a support unit having at least three linear axes and two pivot axes.

Furthermore, to achieve the most homogeneous possible energy distribution, a speed of the at least one nozzle support can be modulated as a function of its advance velocity.

The shape-flexible liquid-tight seal is preferably designed as a plurality of flexible bristles arranged adjacent to one another. The bristles consist in particular of metal, for example, of a nickel-based alloy. Plastic bristles are also conceivable. It is important in this case that the bristles do not cause scratches on its surface as they travel over the tool.

The bristles are preferably oriented curved toward the external environment in this case. During the use of the device, the tool is moved sufficiently close to the surface of the tool so that the bristles are curved still further upon placement of the surface of the tool. The direction of curvature is defined by the pre-curvature.

The orientation of the curvature outward has the further advantage that the bristles applied to the surface of the tool are pressed more strongly against the surface of the tool by the air purge flowing through the intermediate chamber. An overpressure arising in the intermediate chamber can escape through the bristles attached to the outer wall between the surface of the tool and the bristles.

The bristles are furthermore oriented curved in such a way that the free ends of the bristles point in a direction laterally offset to the advance movement of the housing wall, on which the bristles are fastened.

Turning over of the curvature of the bristles upon application of pressure forces is thus effectively avoided, since the free bristle ends can always yield laterally because of their orientation, without losing their sealing action.

A further improvement of this effect is effectuated by an applied rotational movement of the housing wall against the direction of curvature of the bristles.

The angle of attack of the bristles in relation to the axis of rotation of the housing wall may be between 5° and 45° in this case.

The first pressure range setting of the pressure of the cleaning liquid to be applied during the cleaning may be between 40 MPa and 120 MPa, or between 70 MPa and 90 MPa. Such a pressure enables a reliable removal of fiber composite material residues, which have remained on the tool during the demolding of the tool, without damaging a release agent at the same time, however, using which the surface of the tool is coated for the simplest possible and damage-free demolding of the tool.

At the second pressure range setting, the pressure of the cleaning liquid to be applied may be between 200 MPa and 320 MPa, or between 230 MPa and 270 MPa. This elevated pressure enables, after multiple cleaning procedures during which fiber composite material residues were detached, the release agent to now also be completely removed from the tool.

Before the use of the tool for the molding of the following fiber composite material body, the tool is then firstly again coated using a release agent, for example, a primer, a wax, or a film release agent.

According to one advantageous embodiment variant of the method according to the invention, the pressure of the cleaning liquid to be applied during the cleaning is controlled depending on the position, which is used in particular for the most uniform possible energy distribution. This energy distribution on the surface to be cleaned of the tool by the application of the cleaning liquid is in this case preferably between 10 MJ/m$^2$ and 25 MJ/m$^2$.

To assist the residue-free removal of the cleaning liquid during the suctioning off by the suction unit, the cleaning liquid is brought to a temperature close to the vaporization temperature of the cleaning liquid before it is applied to the surface to be cleaned of the tool. The risk that a liquid film will remain on the tool surface is thus reduced by vaporization thereof.

For exact control of the device during a cleaning procedure, the surface of the tool to be cleaned is contactlessly detected by the control unit and the positioning of the at least one nozzle support is accordingly controlled in such a way that the bristles are pressed onto the surface to be cleaned of the tool with curvature of the bristles.

In the following description of the figures, terms such as upper, lower, left, right, front, rear, etc. relate exclusively to the exemplary illustration and position of the tool selected in the respective figures, the central bearing, the jet nozzle, the nozzle support, the housing, the bristles, and the like. These terms are not to be understood as restrictive, i.e., these references can change due to various operating positions or mirror-symmetrical design or the like.

Figure 1:
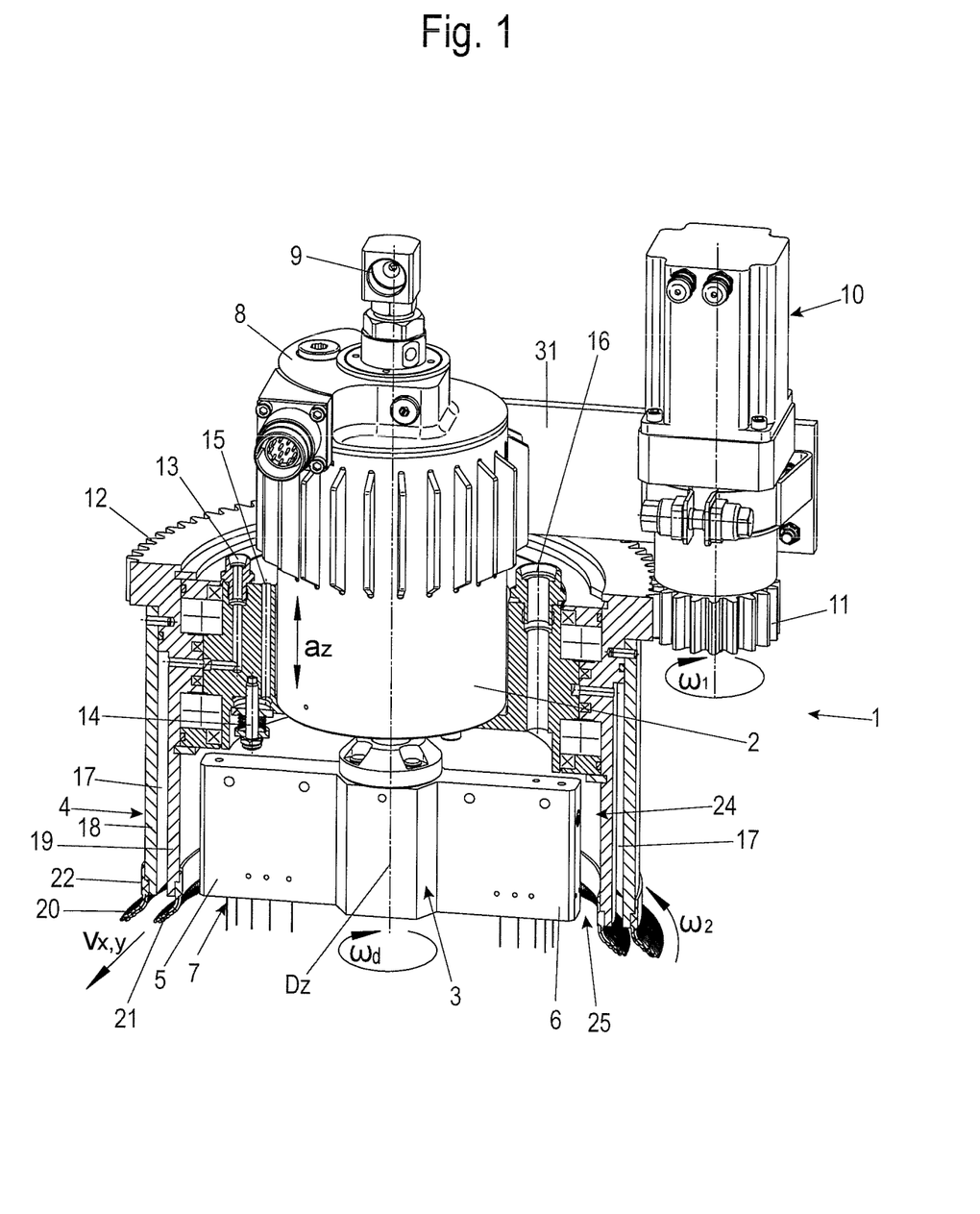
FIG. 1 shows a perspective partial sectional view of an embodiment variant of a device according to the disclosure.
Figure 2:
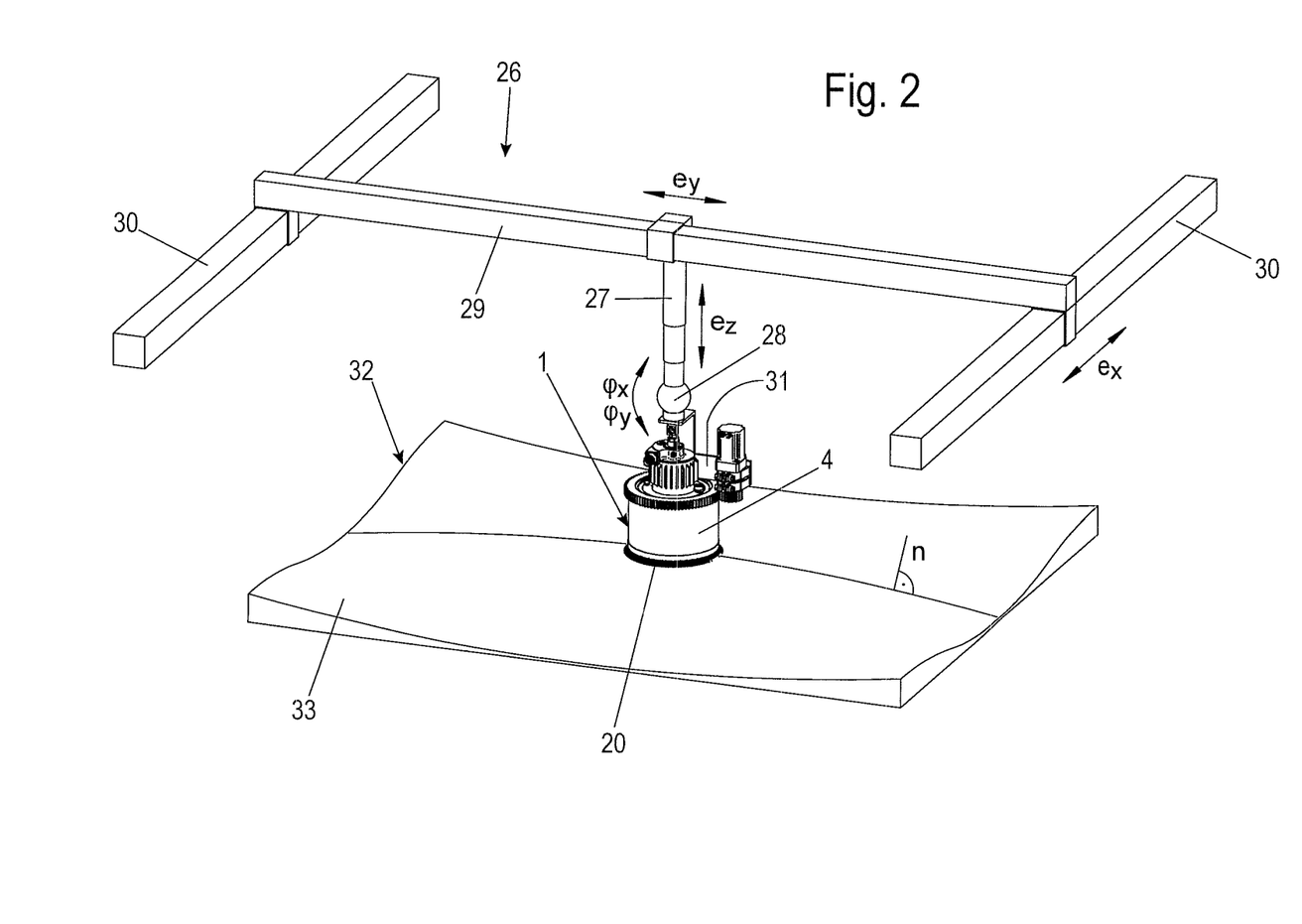
FIG. 2 shows a schematic perspective illustration of the device according to FIG. 1 in cleaning use.

An embodiment of a device according to the disclosure for cleaning a surface 33 illustrated by way of example in FIG. 2 of a tool 32 for the forming of the surface of a large-area fiber composite material body, for example, a wing of an airplane, is identified with the reference sign 1 in FIG. 1.

The device is fastened in this case, as shown in FIG. 2, on a support unit 26, able to guide the device 1 for the cleaning procedure exactly above the surface 33 of the tool 32. The support unit 26 may include in this case at least three linear axes 27, 29, 30, for example, in the form of support linkages arranged so they are movable in relation to one another, and also at least two pivot axes, in the form of a ball joint 28 here, which is capable of pivoting the device 1 by an angle $\varphi_x$ and $\varphi_y$. The joint is placed in this case on a holder 31, on which the device 1 is fastened.

As shown in FIG. 1, the device 1 has a central bearing 2. A nozzle support 3 is held so it is rotatable about a central axis $D_Z$ on the central bearing 2. The drive of the nozzle support 3 is produced in this case by a rotation drive 8, which is fixed on the central bearing 2.

The nozzle support 3 is furthermore designed as vertically-adjustable along its axis of rotation $D_Z$.

The nozzle support 3 comprises at least one jet nozzle 7, multiple such jet nozzles 7 in the exemplary embodiment shown here, from which the highly-pressurized cleaning liquid exits during operation. The supply of the cleaning liquid to the jet nozzles 7 is performed in this case in the interior of the nozzle support 3 through the central bearing 2 to a high-pressure fitting 9.

In the embodiment shown here, the nozzle support 3 comprises two arms 5, 6, which are formed equally long radially in relation to the axis of rotation $D_Z$. A control unit (not shown in the figures) is used for the control of the pressure of the cleaning liquid to be applied.

The nozzle support 3 is enclosed by a housing 4, which is formed bell-shaped here, and which is open toward the surface 33 to be cleaned of the tool 32.

The housing 4 furthermore comprises a vacuum fitting 16 for connection to a suction unit, with which an interior 24 of the housing 4, in which the nozzle support 3 is arranged, can be suctioned off. To avoid an excessively strong partial vacuum in the interior 24 of the housing 4, the interior 24 of the housing 4 has a pressure valve 14, which is connected via a borehole 15 in the housing 4 to the external environment, to enable a supply of outside air through the borehole 15 into the interior 24 of the housing 4.

As can furthermore be seen in FIG. 1, the housing 4 is formed having a double-walled lateral surface, having an intermediate chamber 17 formed between an outer wall 18 and an inner wall 19.

A shape-flexible liquid-tight seal 20, 21 is arranged at an open end of the housing 4, using which the space between the nozzle support 3 and the surface 33 to be cleaned of the body 32, as shown in FIG. 2, can be sealed off from the external environment.

Figure 3:
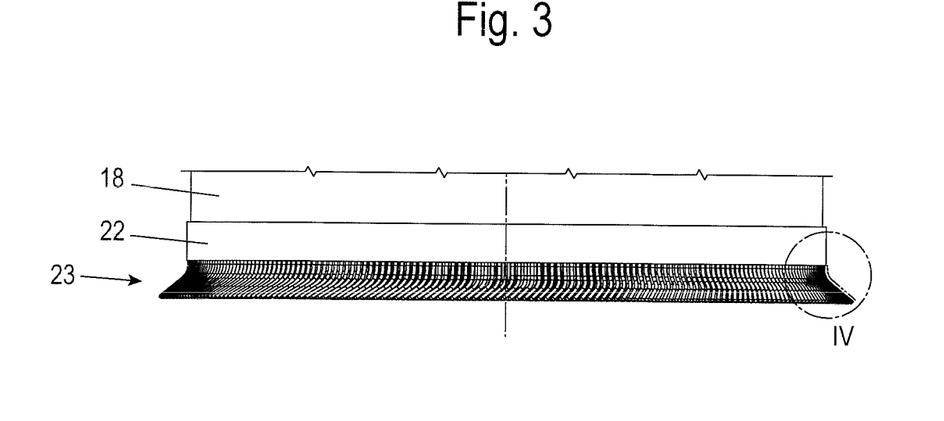
FIG. 3 shows a frontal view of the seal of the device.

The shape-flexible liquid-tight seal 20, 21 is formed in the embodiment variant shown here in the form of flexible bristles 23 arranged adjacent to one another. The bristles 23, as shown in FIGS. 1, 3, and 4, are arranged adjacent to one another on a fastening collar 22 and thus form a sealing strip.

As shown in FIG. 1, such a strip of bristles 23 is fastened, for example, adhesively bonded, on the one hand, on the outer wall 18 and, on the other hand, on the inner wall 19.

The bristles 23 may in this case be made of a metal, for example, a nickel-based compound. Manufacturing the bristles 23 from a plastic is also conceivable. It is important that the material of the bristles 23 does not damage the surface 33 of the tool 32 as they slide over the surface 33 of the tool 32.

Figure 4:
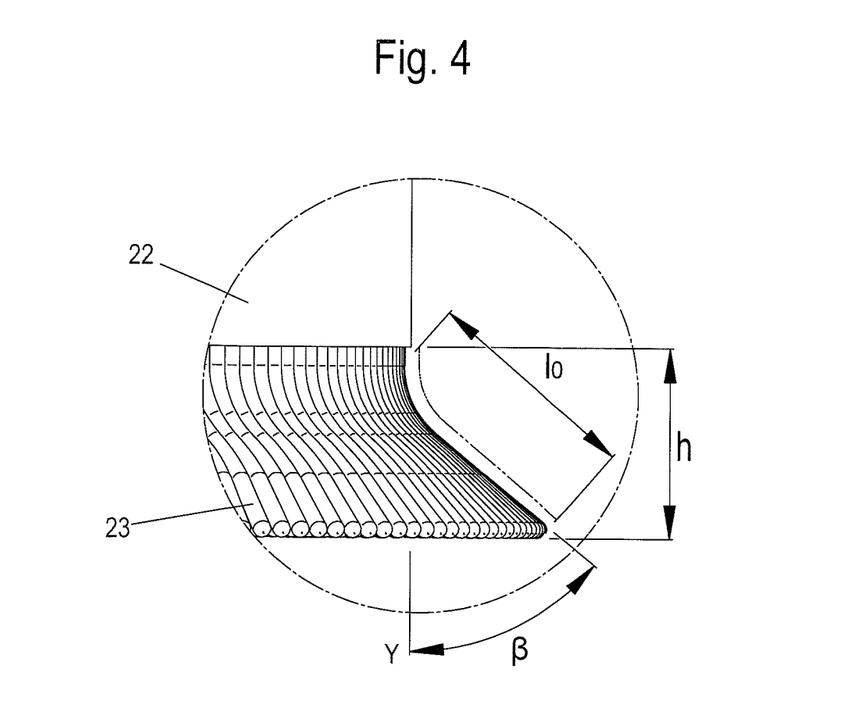
FIG. 4 shows a perspective detail view of the detail identified with IV in FIG. 3 to illustrate the bristles of the seal.
Figure 5:
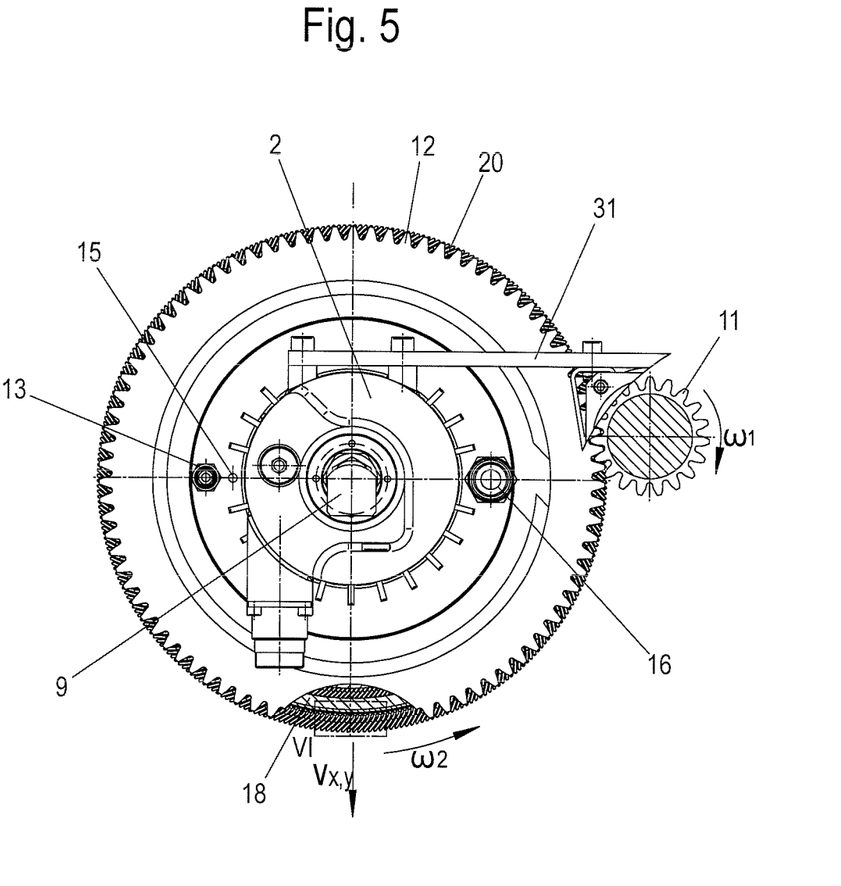
FIG. 5 shows a top view of the device shown in FIG. 1.

To enable a sufficient seal of the interior 24 by the bristles 23 even as the device 1 travels over points of discontinuity of the surface 33, for example, edges or indentations, without permitting the cleaning medium to escape from the interior 24 of the housing 4, absolute length $l_0$ of the bristles 23 is dimensioned in such a way that the vertical distance h which can be bridged by the bristles 23 is variable, as indicated in FIG. 4.

For this purpose, the bristles 23 are oriented curved toward the external environment. The curvature of the bristles 23 outward by an angle of attack β in relation to the axis of rotation $D_Z$ of the housing wall 18, 19 may be between 5° and 45°. This curvature outward furthermore enables pressing on of the bristles 23 attached to the inner wall 19 by the supply of an air purge, which is blown through an air purge fitting 13, shown in FIG. 1, into the intermediate chamber 17, and at the same time presses at its open end onto the free ends of the bristles 23 of the bristles 23 attached on the inner wall 19.

As is furthermore shown in FIG. 1, a lateral surface of the housing 4 is provided with a gear rim 12, with which a gear wheel 11 of a drive 10 meshes, which is used for the rotation of the inner wall 19 of the housing 4. It is also conceivable to embody the outer wall 18 as rotatable instead of the inner wall 19 or to design the outer wall and the inner wall to rotate in opposite directions.

Figure 6:
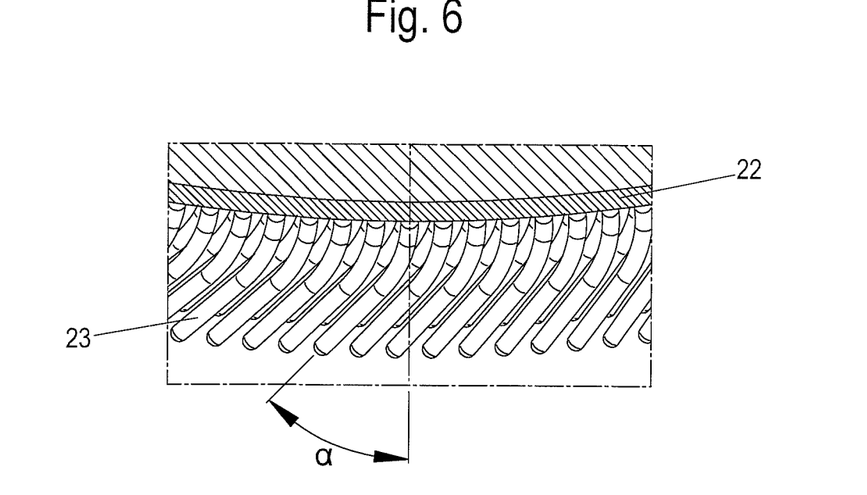
FIG. 6 shows a detail view of the detail identified with VI in FIG. 5 of the seal to illustrate the curvature of the bristles.

As shown in FIG. 6, the bristles 23, to prevent turning over caused by the rotation of the inner wall 19 of the housing 4, may be oriented curved in such a way that the free ends of the bristles 23 point in a direction opposite to the rotational direction of the inner wall 19 of the housing 4, which rotates at a speed $\omega_2$ around the axis $D_Z$, on which the bristles 23 are fastened.

The speed $\omega_p$ of the at least one nozzle support 3 can be modulated by the control unit in this case as a function of the advance velocity $v_{x,y}$ of the device.

If the bristles 23 are fastened on a nonrotating wall, the bristles 23 may be oriented curved in such a way that the free ends of the bristles 23 point in a direction laterally offset in relation to the advance direction of the housing wall 18, 19, on which the bristles 23 are fastened.

The control unit furthermore has the task of controlling the pressure of the cleaning liquid exiting from the jet nozzles 7. The control unit has at least two pressure range settings for this purpose.

In this case, the pressure in the first pressure range setting is set in such a way that fiber composite material residues are removable from a surface 33 of the tool 32 coated using a release agent, without simultaneously damaging the release agent layer on the surface 33 of the tool 32.

This pressure range setting is always employed in this case after completed demolding of the fiber composite material body from the tool 32 and is used for removing fiber and material residues from the tool 32.

The second pressure range setting is such that the pressure of the cleaning liquid exiting from the jet nozzles 7 is set in such a way that the release agent is removable from the surface 33 of the tool 32 using the jet nozzles 7. This enables, after multiple uses of such a tool 32, for it to be provided with a new release agent coating, for which the release agent layer previously applied to the tool 32 firstly has to be completely removed, which is enabled using the device 1 by setting the second pressure range setting.

In the first pressure range setting, the pressure of the cleaning liquid to be applied is between 40 MPa and 120 MPa, for example, between 70 MPa and 90 MPa.

In the second pressure range setting, in which the release agent is also to be removed from the surface 33 of the tool 32, the applied pressure is between 200 MPa and 320 MPa, for example, between 230 MPa and 270 MPa.

The pressures to be applied are controlled in a position-dependent manner in this case depending on the intended use and distance of the jet nozzles 7 from the surface 33 to be cleaned.

The control is preferably carried out in this case in such a way that an energy distribution exerted on the surface 33 to be cleaned of the tool 32 by the application of the cleaning liquid is between 10 MJ/m² and 25 MJ/m².

To furthermore avoid cleaning liquid residues remaining on the cleaned surface 33 after completed cleaning using the device 1, the cleaning liquid itself may be brought to a temperature close to the vaporization temperature of the cleaning liquid before the application to the surface 33 to be cleaned of the tool 32. In the case of the use of water as the cleaning liquid, water having a temperature of greater than 90° C. may be used.

The control unit furthermore enables a contactless detection of the surface to be cleaned of the tool 32, whether, for example, by connection to an optical sensor or the like or the input of the contours of the surface 33 to be cleaned of the tool 32 via another input interface.

The position of the nozzle support is accordingly controlled in such a way that the bristles 23 for the cleaning procedure are pressed enough onto the surface 33 to be cleaned of the tool 32 that they rest curved on the surface 33. The mounting of the device 1 via the support unit 26 and the contactless control via the control unit furthermore enables exclusively the bristles 23 of the seal 20, 21 of the device 1 to touch the surface 33 to be cleaned of the tool 32 during the cleaning procedure, so that soiling or damage of the surface 33 of the tool 32 by moving linkages or the like is avoided and so that close adaptation of the cleaning device 1 to the three-dimensional surface 33 may be effected.

The invention claimed is:

1. A device for cleaning a surface of a tool for the forming of a surface of a large-area fiber composite material body using a pressurized cleaning liquid, comprising:
a nozzle support rotatably mounted on a central bearing;
at least one jet nozzle held in an arm of the nozzle support, from which the pressurized cleaning liquid exits during operation;
a control unit for controlling the pressure of the cleaning liquid;
wherein the nozzle support is enclosed by a housing, which is provided with an opening toward the surface of the tool to be cleaned;
wherein the housing has a double-walled lateral surface having an intermediate chamber formed between an outer wall and an inner wall, wherein a first shape-flexible seal is arranged on the outer wall and a second shape-flexible seal is arranged on the inner wall;
wherein at least one of the outer wall and the inner wall is rotatable about an axis of rotation of the nozzle support;
wherein the housing is attached to a suction unit with which an interior of the housing, in which the nozzle support is arranged, can be suctioned off;
wherein the interior of the housing is connected via a pressure valve to an external environment;
wherein the first shape-flexible seal and the second shape-flexible seal cooperate to form a liquid-tight seal at an end of the housing forming the opening, which liquid-tight seal seals the space between the nozzle support and the surface to be cleaned of the body from the external environment; and
wherein the control unit has at least two pressure range settings, wherein in a first pressure range setting, the pressure of the cleaning liquid exiting from the at least one jet nozzle is set in such a way that fiber composite material residues are removable from a surface of the tool coated using a release agent without damaging the release agent and, in a second pressure range setting, the pressure of the cleaning liquid exiting from the at least one jet nozzle is set in such a way that the release agent is removable from the surface of the tool using the at least one jet nozzle.

2. The device according to claim 1, wherein the intermediate chamber is operationally connected to an air purge unit.

3. The device according to claim 1, wherein the nozzle support is vertically-adjustable along its axis of rotation.

4. The device according to claim 1, wherein the central bearing is fixed on a support unit having at least three linear axes and two pivot axes.

5. The device according to claim 1, wherein a speed of the nozzle support can be modulated in dependence on an advance velocity of the nozzle support.

6. The device according to claim 1, wherein the first shape-flexible seal and the second shape-flexible seal are each formed as a plurality of flexible metal or plastic bristles arranged adjacent to one another.

7. The device according to claim 6, wherein the bristles of the first shape-flexible seal and the bristles of the second shape-flexible seal are oriented curved toward the external environment.

8. The device according to claim 6, wherein the bristles of the first shape-flexible seal are fastened to the outer wall and the bristles of the second shape-flexible seal are fastened to the inner wall, wherein the bristles of the first shape-flexible seal are curved in such a way that free ends of the bristles of the first shape-flexible seal point in a direction laterally offset in relation to an advance direction of the outer wall, and wherein the bristles of the second shape-flexible seal are curved in such a way that free ends of the bristles of the second shape-flexible seal point in a direction laterally offset in relation to an advance direction of the inner wall.

9. The device according to claim 6, wherein the bristles of the first shape-flexible seal are fastened to the outer wall, wherein the bristles of the second shape-flexible seal are fastened to the inner wall, wherein the bristles of the first shape-flexible seal are curved in such a way that free ends of the bristles of the first shape-flexible seal point in a direction opposite to a rotational direction of the outer wall.

10. The device according to claim 7, wherein an angle of attack of the bristles of the first shape-flexible seal in relation to an axis of rotation of the outer wall is between 5° and 45° or wherein an angle of attack of the bristles of the second shape-flexible seal in relation to an axis of rotation of the inner wall is between 5° and 45°.

11. The device according to claim 1, wherein in the first pressure range setting, the pressure of cleaning liquid to be applied during cleaning is between 70 MPa and 90 MPa.

12. The device according to claim 1, wherein in the second pressure range setting, the pressure of cleaning liquid to be applied during cleaning is between 230 MPa and 270 MPa.

13. A method for cleaning a surface of a tool for shaping a surface of a large-area fiber composite material body using a device comprising a nozzle support rotatably mounted on a central bearing; at least one jet nozzle held in an arm of the nozzle support, from which pressurized cleaning liquid exits during operation; a control unit for controlling the pressure of the cleaning liquid;
wherein the nozzle support is enclosed by a housing, which is provided with an opening toward the surface of the tool to be cleaned; wherein the housing has a double-walled lateral surface having an intermediate chamber formed between an outer wall and an inner wall, wherein a first shape-flexible seal is arranged on the outer wall and a second shape-flexible seal is arranged on the inner wall; wherein at least one of the outer wall and the inner wall is rotatable about an axis of rotation of the nozzle support; wherein the housing is attached to a suction unit with which an interior of the housing, in which the nozzle support is arranged, can be suctioned off; wherein the interior of the housing is connected via a pressure valve to an external environment;

wherein the first shape-flexible seal and the second shape-flexible seal cooperate to form a liquid-tight seal arranged at an end of the housing forming the opening, which liquid-tight seal seals the space between the nozzle support and the surface to be cleaned of the body from the external environment;

and wherein the control unit has at least two pressure range settings, wherein in a first pressure range setting, the pressure of the cleaning liquid exiting from the at least one jet nozzle is set in such a way that fiber composite material residues are removable from a surface of the tool coated using a release agent without damaging the release agent and, in a second pressure range setting, the pressure of the cleaning liquid exiting from the at least one jet nozzle is set in such a way that the release agent is removable from the surface of the tool using the at least one jet nozzle, the method comprising:

controlling by the control unit at least a position and advance velocity of the nozzle support in relation to the surface to be cleaned of the tool and a pressure to be applied of the cleaning liquid exiting from the at least one jet nozzle.

14. The method according to claim 13, wherein the pressure of cleaning liquid to be applied is controlled in a position-dependent manner during cleaning.

15. The method according to claim 13, wherein, in the first pressure range setting, the pressure of cleaning liquid to be applied is between 70 MPa and 90 MPa.

16. The method according to claim 13, wherein in the second pressure range setting, the pressure of cleaning liquid to be applied is between 230 MPa and 270 MPa.

17. The method according to claim 13, wherein an energy distribution exerted on the surface to be cleaned of the tool by application of the cleaning liquid is between 10 $MJ/m^2$ and 25 $MJ/m^2$.

18. The method according to claim 13, wherein the cleaning liquid is removed from the tool surface by the suction unit, and wherein the cleaning liquid is brought to a temperature sufficiently close to the vaporization temperature of the cleaning liquid before its application to the tool surface to preclude a liquid film remaining on the tool surface after the cleaning liquid is removed from the tool surface by the suction unit.

19. The method according to claim 13, wherein the surface to be cleaned of the tool is contactlessly detected by the control unit and positioning of the nozzle support is accordingly controlled in such a way that bristles attached to the outer wall are pressed onto the surface to be cleaned of the tool with curvature of the bristles.

20. The method according to claim 13, wherein the first shape-flexible seal of the device comprises bristles, wherein the second shape-flexible seal comprises bristles, and wherein only the bristles of the first and second shape-flexible seals of the device touch the surface to be cleaned of the tool during cleaning of the surface of the tool.

* * * * *